Dec. 28, 1948.  G. P. MITCHELL  2,457,258
PULLING IMPLEMENT FOR DETACHING INSULATORS
Filed Oct. 23, 1947  2 Sheets-Sheet 1
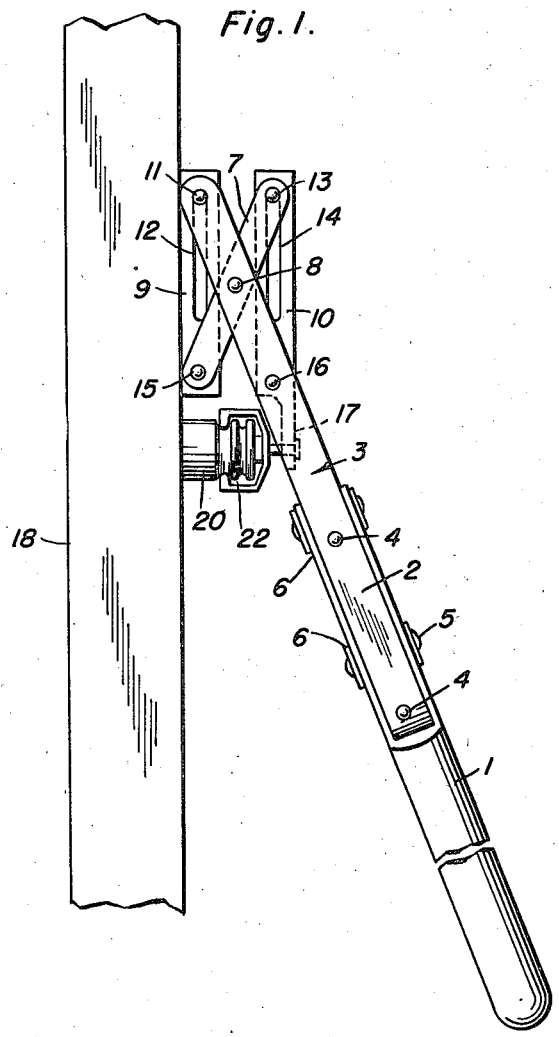
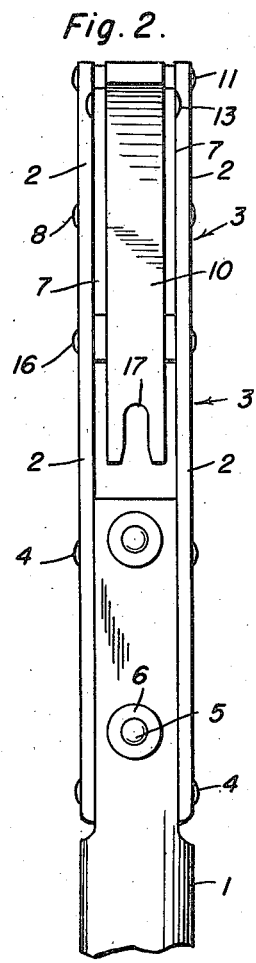
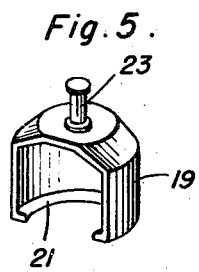
Inventor
Gordon P. Mitchell Dec. 28, 1948.  G. P. MITCHELL  2,457,258
PULLING IMPLEMENT FOR DETACHING INSULATORS
Filed Oct. 23, 1947  2 Sheets-Sheet 2
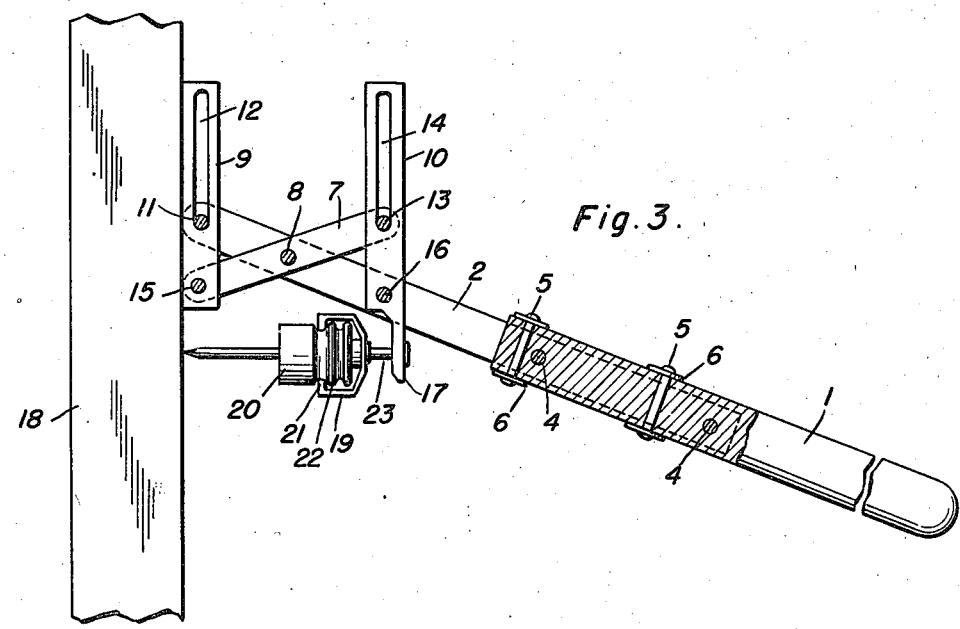
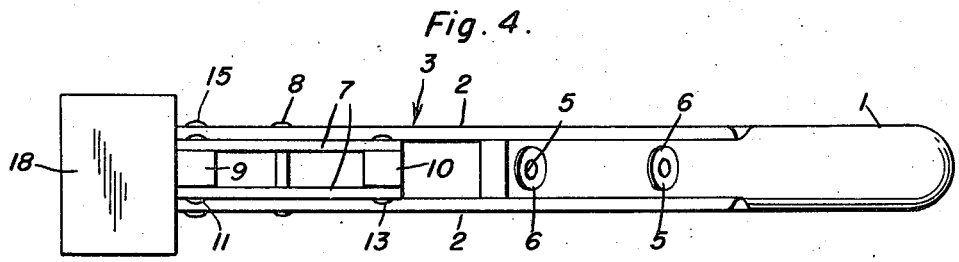
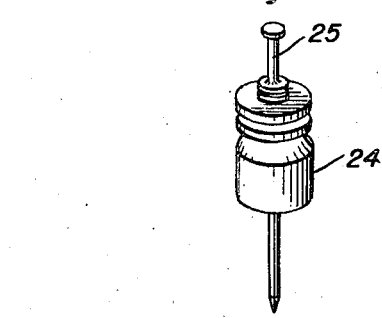
Inventor
Gordon P. Mitchell
By Clarence A. O'Brien
and Harvey B. Jacobson
Attorneys Patented Dec. 28, 1948

2,457,258

UNITED STATES PATENT OFFICE 2,457,258

PULLING IMPLEMENT FOR DETACHING INSULATORS

Gordon P. Mitchell, Merrill, Wis.

Application October 23, 1947, Serial No. 781,623

4 Claims. (Cl. 254—21)

My invention relates to improvements in pulling implements for detaching the insulators of electric fences from posts.

The primary object of the invention is to provide a simple form of inexpensive implement for exerting leverage against such insulators to easily detach the same and with a straight pull obviating breaking of the insulators.

Another object is to provide an implement of the character and for the purpose above set forth which is easy to apply, not liable to slip, and is adapted for detaching different types of insulators.

Other and subordinate objects within the purview of my invention, together with the precise nature of my improvements will be readily understood when the succeeding description and claims are read with reference to the drawings accompanying and forming part of the specification.

In said drawings:

Figure 1 is a view in side elevation of my improved implement in the preferred embodiment thereof illustrating the same applied to an insulator of one type and against a fence post preparatory to operation for detaching the insulator from the post;

Figure 2 is a fragmentary view in rear elevation drawn to a larger scale;

Figure 3 is a view similar to Figure 1 illustrating the implement operated to detach the insulator;

Figure 4 is a view in plan;

Figure 5 is a view in perspective of the cap drawn to a larger scale;

Figure 6 is a similar view of another type of insulator which my improved implement is adapted to detach.

Referring now to the drawings by numerals, my improved implement, as shown, comprises an elongated handle 1 preferably of wood, or any other suitable insulation material, having a pair of metal bars 2 extending forwardly of the front end thereof for a suitable distance, from opposite sides thereof, parallel to each other and to said handle. The side bars 2 form a split shank 3 for the implement as will presently more clearly appear. Any suitable means may be utilized for attaching the side bars 2 to the handle 1, but, preferably, said bars are mortised into opposite sides of the front end portion of said handle 1 and secured thereto by transverse rivet end studs 4. Rivet end studs 5 extend through said front end portion of the handle 1 adjacent said studs 4 at right angles to said studs 4 with enlarged end discs 6 thereon reinforcing the handle 1 against being split longitudinally by strain on said studs 4 when leverage is exerted by the implement in a manner presently described.

A pair of spaced apart side by side links 7 are pivoted midway of the ends thereof, as at 8, between the outer end portions of the side bars 2, which is to say, in the outer end portion of the shank 3.

A pair of short front and rear, rectangular, parallel bars 9, 10 are provided on opposite sides of the pivot 8 to extend diagonally between the side bars 2, or in other words in the shank 3, and between the pair of links 7. A transverse pivot pin 11 in the front end of the side bars 2, or shank 3, extends through a longitudinal slot 12 in the front parallel bar 9, and a similar pivot pin 13 extends through one end of the pair of links 7 and a similar slot 14 in the rear parallel bar 10. Thus the front ends of the side bars 2 are pivotally and slidably connected to the front parallel bar 9 and one end of the pair of links 7 are similarly connected to the rear parallel bar 10. The other ends of the pair of links 7 are pivotally connected by a transverse pin 15 to one end of the front parallel bar 9, and the rear parallel bar 10 is similarly connected adjacent its rear end to the pair of side bars 2, or shank 3, by a transverse pivot pin 16.

Contiguous of the pivot pin 16, the rear parallel bar 10 is formed with an end, bifurcated claw 17. For a reason presently clear, the pivot pins 11, 13, 15, 16 are equidistantly spaced from the pivot 8.

As a result of the described arrangement of the side bars 2, or shank 3, and the pair of links 7 and parallel bars 9, 10, said side bars 2, or shank 3, between the pivot pins 11, 16 form together with the pair of links 7 a lazy tongs adapted, when the front parallel bar 9 is placed flat against a fence post 18, and the handle 1 swung away from said post, to open and move the rear parallel bar 10 away from said post and the front bar 9, while maintaining said rear parallel bar 10 parallel to said post 18 and said front bar 9 thus causing the claw 17 to move away from said post 18 at a right angle thereto.

A cap 19, open at one side to be fitted over the usual beaded insulator 20, and having an internal rim flange 21 for fitting behind a bead 22 on said insulator, is provided with an axial, headed bottom stud 23 adapted to fit in the claw 17 to attach said claw to said insulator 20.

As shown in Figure 1, in using the described implement in connection with the described type of insulator 20, the front parallel bar 9 is placed in upright position against the fence post 18 above said insulator 20, the handle 1 moved toward said post to close the described lazy tongs, and thereby move the rear parallel bar 10 close to the insulator 20 with the claw 17 opposite the outer end of said insulator and suitably spaced therefrom for applying the cap 19. The cap 19 is then applied to the insulator 20, in the manner described, and the stud 23 attached to the claw 17. Then the handle 1 is swung away from the post 18 to open the described lazy tongs and cause said claw 17 and cap 19 to pull the insulator 20 outwardly of said post 18 in a straight line, thereby detaching said insulator, all as shown in Figure 2.

In detaching the type of insulator 24, shown in Figure 6, which is provided with an axial headed outer end stud 25, the claw 17 is disposed directly over said stud to straddle the same, and the use of the cap 19 is dispensed with. Otherwise, the use and operation of the implement is the same as described.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

Having thus described the invention, what is claimed as new is:

1. An implement for detaching an insulator from one side of a post comprising an elongated handle, a longitudinally split shank extending forwardly from said handle, a cross bar pivoted in the front end of said shank for engagement sidewise with said side of the post adjacent the insulator and on which said shank is swingable by said handle, a second cross bar pivoted in said shank for swinging therein parallel to the first cross bar, means on said second cross bar for attaching the same to said insulator, and means for causing said second cross bar to maintain a position parallel to the first cross bar during swinging of said shank by said handle whereby said attaching means is adapted to exert a pull on said insulator in a direction at a right angle to said post.

2. An implement for detaching an insulator from one side of a post comprising an elongated handle, a longitudinally split shank extending forwardly from said handle, a cross bar pivoted in the front end of said shank for engagement sidewise with said side of the post adjacent the insulator and on which said shank is swingable by said handle, a second cross bar pivoted in said shank for swinging therein parallel to the first cross bar, means on said second cross bar for attaching the same to said insulator, and means for causing said second cross bar to maintain a position parallel to the first cross bar during swinging of said shank by said handle whereby said attaching means is adapted to exert a pull on said insulator in a direction at a right angle to said post, the means first mentioned comprising an end claw on the second cross bar.

3. An implement for detaching an insulator from one side of a post comprising an elongated handle, a longitudinally split shank extending forwardly from said handle, a cross bar pivoted in the front end of said shank for engagement sidewise with said side of the post adjacent the insulator and on which said shank is swingable by said handle, a second cross bar pivoted in said shank for swinging therein parallel to the first cross bar, means on said second cross bar for attaching the same to said insulator, and means for causing said second cross bar to maintain a position parallel to the first cross bar during swinging of said shank by said handle whereby said attaching means is adapted to exert a pull on said insulator in a direction at a right angle to said post, the last mentioned means comprising a link pivoted intermediate the ends thereof in said shank with one end pivoted to one cross bar and the other end thereof pivotally and slidably connected to the second cross bar and a slot in the first cross bar in which the pivot thereof is slidable.

4. An implement for detaching an insulator from one side of a post comprising an elongated handle, a longitudinally split shank extending forwardly from said handle, a cross bar pivoted in the front end of said shank for engagement sidewise with said side of the post adjacent the insulator and on which said shank is swingable by said handle, a second cross bar pivoted in said shank for swinging therein parallel to the first cross bar, means on said second cross bar for attaching the same to said insulator, and means for causing said second cross bar to maintain a position parallel to the first cross bar during swinging of said shank by said handle whereby said attaching means is adapted to exert a pull on said insulator in a direction at a right angle to said post, the first mentioned means comprising an end claw on the second cross bar, and a member for attaching to said insulator having a headed stud thereon for fitting in said claw.

GORDON P. MITCHELL.

No references cited.